H. FISHER.
FILM HOLDER FOR CINEMATOGRAPH AND LIKE MACHINES.
APPLICATION FILED JUNE 6, 1914.

1,126,436.

Patented Jan. 26, 1915.

2 SHEETS—SHEET 1.

Witnesses
B. M. Allen
J. B. Le Blanc

Inventor
Horace Fisher
By Serrell & Son
his Attorneys

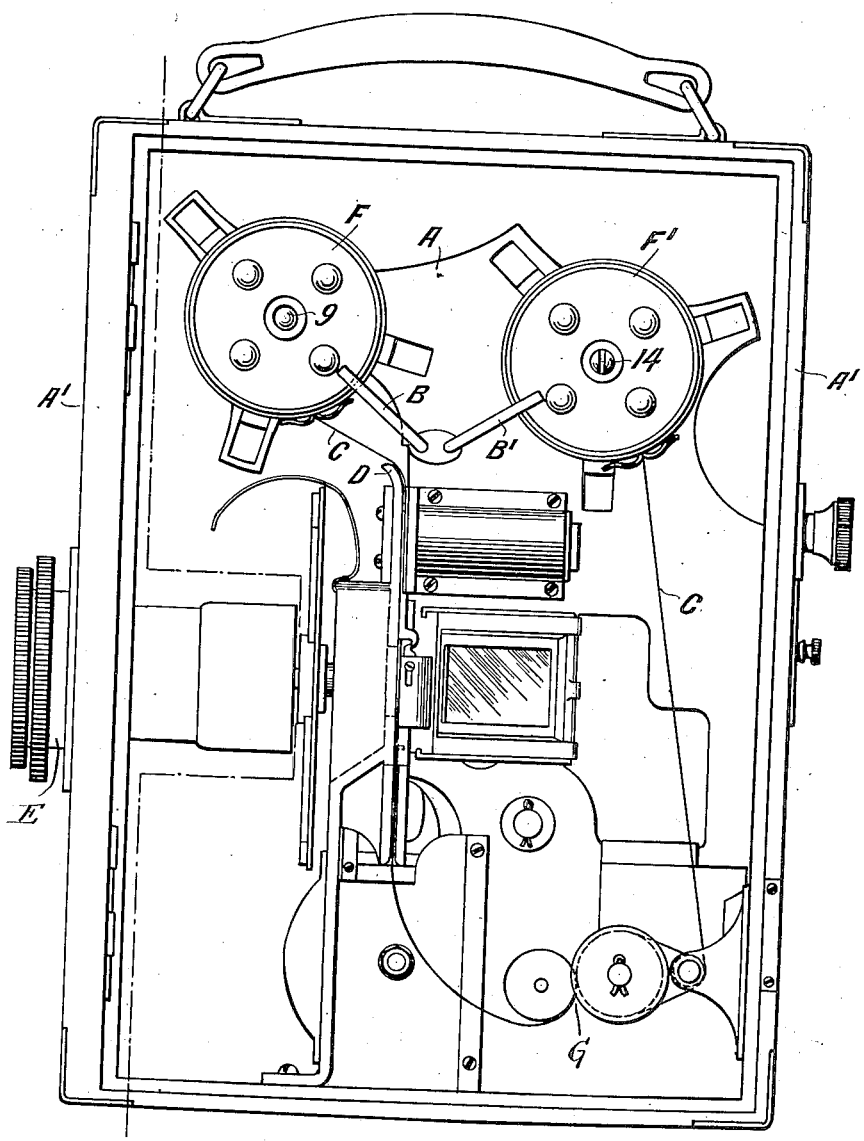

UNITED STATES PATENT OFFICE.

HORACE FISHER, OF LETCHWORTH, ENGLAND, ASSIGNOR TO WILLIAM EDWARD GARFORTH, OF PONTEFRACT, YORKSHIRE, ENGLAND.

FILM-HOLDER FOR CINEMATOGRAPH AND LIKE MACHINES.

1,126,436.     Specification of Letters Patent.     Patented Jan. 26, 1915.

Application filed June 6, 1914. Serial No. 843,378.

*To all whom it may concern:*

Be it known that I, HORACE FISHER, photographic-works manager, a subject of the King of Great Britain, residing at 12 Baldock road, Letchworth, Hertfordshire, England, have invented new and useful Improvements in Film-Holders for Cinematograph and like Machines, and of which the following is a specification.

The object of this invention is to construct a film holder, which can be sold containing an unexposed film, and which unexposed film in its holder may be inserted into the cinematograph camera in daylight, without taking the usual precautions to protect the film from actinic light, and the leading end of the film may then be attached to a similar film holder placed in the cinematograph camera, and the reel to which it is attached within the holder may then be operated after the camera has been closed, and the film thus be drawn from the holder first inserted to the new reel while exposures are taking place. The film holder above referred to is also interchangeable in two positions in the cinematograph camera, so that when a film has been drawn entirely off a holder and passed on to the reel of the receiving holder, then the holder which previously contained the unexposed film can be removed and used as a receiving holder, a new holder containing a new unexposed film being then substituted in its place.

A film holder according to this invention consists of a preferably cylindrical box, having a removable lid, the base of the box being fitted or formed centrally with an inwardly extending sleeve, and the lid being similarly fitted or formed so that the box can be slid on to a supporting spindle, and means are provided by which the box itself, when on such spindle, is held stationary.

The box is adapted to contain a tubular reel, which passes at its ends over the sleeves on the interior of the box, and is thus supported so that it can revolve or be revolved. The box is light-tight, and is formed with a slit in its circular wall parallel to the axis of the box, which slit is fitted with protecting clips or guards of curved form, the curved surface of one guard being adjacent to the curved surface of the other guard, and these adjacent surfaces are covered with velvet or some equivalent material, so as to permit of the passage of the film, while at the same time keeping the box light-tight.

Figure 1:
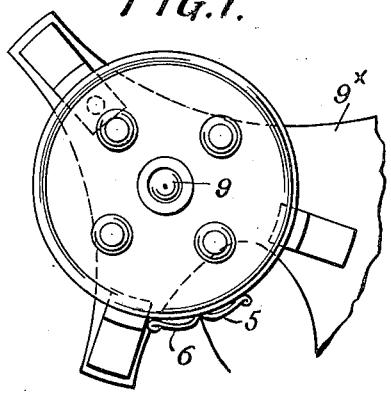
Figure 2:
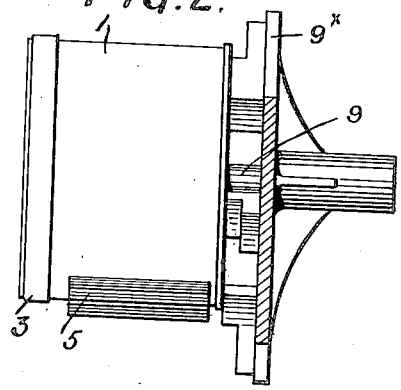
Figure 3:
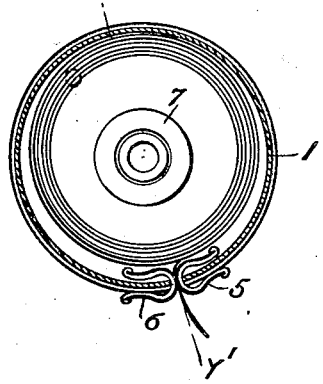
Figure 4:
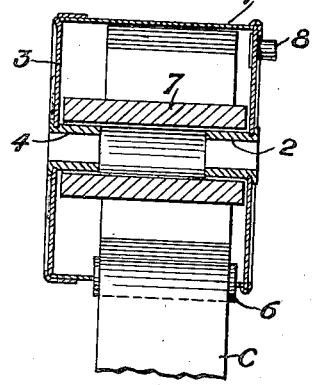
Figure 7:
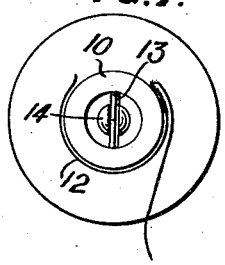
Figure 6:
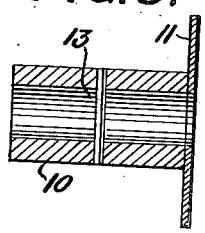
Figure 5:
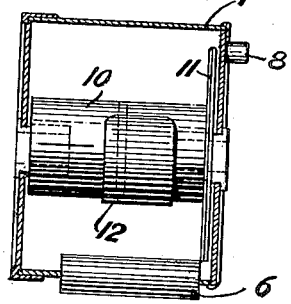

The invention will be more particularly described with reference to the accompanying drawings, whereon, Figures 1 to 7 inclusive show examples of constructions of the film holders, and Fig. 8 illustrates an application of the invention to a cinematographic camera. Fig. 1 is a side elevation showing the reel holder, containing the unexposed film, carried in position upon a stud spindle projecting from the framework, and Fig. 2 is a rear elevation of the same. Fig. 3 is a sectional side elevation of the holder shown at Fig. 1, but with the lid or cap removed, and Fig. 4 is a transverse section on the line $X^1$—$Y^1$ of Fig. 3. Fig. 5 shows a holder in section, with a reel in position within it, for receiving the film drawn from another holder. Fig. 6 shows the reel in section, and Fig. 7 is a side elevation of the reel.

The holders according to this invention are shown applied to a cinematographic camera at Fig. 8 which is a left hand side elevation of the camera with the side plate of the case removed.

The film holder comprises a cylindrical box which is held stationary in the apparatus to which it is applied such as a cinematographic camera, and contains and carries a revoluble reel.

The construction will be clearly seen by reference to Figs. 1 to 4 of the accompanying drawings, and particularly to Fig. 4. The body of the box 1 is fitted at the center of its base with a short internally extending sleeve 2, or it may be formed with an inturned flange; the lid 3 fits with its flanged edge externally around the cylindrical end of the box, and this lid is also fitted with a short inwardly extending sleeve 4, coaxial with the sleeve 2.

In the circular wall of the box 1 a slot is formed parallel to the axis of the box, through which slot protecting clips or guards, 5, 6 are passed; each of these guards consists of a foundation of metal bent into a curved form as shown at Fig. 3, faced with velvet and arranged so that their curved velvet covered faces are in surface contact, whereby a light protected aperture is formed, through which the film can be drawn past the velvet surfaces without light entering the cylindrical box 1; beyond this the box 1 is fitted with a fixed pin or projection 8 to enable it to be keyed in position within the camera or other apparatus by contacting with or fitting into a stationary part.

The box 1 as shown in Fig. 4 contains a reel 7, upon which the film is carried, and the reel is supported upon the tubular sleeves 2 and 4 of the box, which sleeves thus form bearings for the reel, while a supporting spindle, such as 9, extending from the framework 9ˣ of the apparatus, passes through the tubular sleeves 2 and 4 to carry the film holder and when in this position the pin or projection 8 on the box enters a recess in the stationary framework 9ˣ of the apparatus. Such a reel 7, as illustrated at Fig. 4, is adapted to carry an unexposed film, and the film may be sold to the user in such a light-tight holder as has been described and which can be inserted like a cartridge into a cinematographic camera during daylight. The leading end of the film can then be drawn out and attached to a reel in a similar empty holder, which latter reel is driven by the mechanism of the apparatus, so that the film drawn from the first mentioned holder becomes wound upon the reel of the second similar holder.

A suitable form of reel for receiving and winding the film proceeding from the first holder is shown at Figs. 5, 6, and 7. This reel 10 consists of a sleeve similar to the reel 7 of Fig. 4, adapted to be carried upon the sleeves 2 and 4 of the box 1, which is exactly similar to the box described with reference to Figs. 1 to 4. The reel 10, however, is formed or provided preferably with a flange such as 11, placed adjacent to the base of the box 1, and it is also fitted with a metal clip such as 12, between which clip and the body of the reel, the end of the film is inserted and so secured, after being passed between the velvet covered guards 5, 6 of the aperture of the box, such as has already been described. The winding-on reel 10, may either be non-circular interiorly or may be provided with a cross pin 13, as shown, in order to lock it to a spindle upon which the box 1 is placed, and the box is, as previously stated, precisely similar to the box containing the unexposed reel.

The box 1, Fig. 5, with the reel 10, having the end of the film fixed thereto as described, is then fitted on to a spindle 14, which is divided so as to permit of the passage of the pin 13, through the medium of which the reel 10 is revolved with the spindle 14, while the box 1 is held stationary by the projection 8, engaging in the stationary framework.

The film holders according to this invention are shown applied to a cinematographic camera at Fig. 8 of the accompanying drawings, which will now be referred to.

The framework A, within the case A¹, carries the stationary spindle 9 upon which the box 1 containing the unexposed film is placed, and the box 1 is held stationary by the projection 8 before described and is prevented from leaving the spindle 9 by a pivoted arm B which bears against the lid of the box 1 and can be turned when it is desired to remove the box from the spindle 9.

The film C, passes from the stationary film holder F over the rear face of a stationary guide plate D formed with an aperture, opposite the lens E, below which plate D is located feed mechanism the details of which it is not necessary to deal with in this specification, but which mechanism is adapted to draw the film C intermittently from the film holder which is shown at F. The film then passes through a tension device G, and from thence to the film holder indicated at F¹.

In employing film holders such as described, that box containing the unexposed film is simply placed in position upon the spindle 9, and the leading end of the film can then be drawn out over the rear of the plate D, through the intermittent feed device and through the tension device G, and then attached to the reel, such as 10 in the film holder F¹, and the lid of the latter can then be replaced and the box held in position by an arm B¹ similar to the arm B before referred to. When this connection has been made the slack of the film is taken up by a few turns of the operating handle of the feed mechanism, and then the camera side is closed. The leading end of the film, which has been drawn through the slit from the holder F, is, of course, when applied to a cinematographic camera, exposed and spoilt, but it is usual in such cameras to have a waste end, and therefore the exposure of this piece of the film has no disadvantage. After the exposures have been made, the entire film will be found to be contained within the holder F¹, the reel of which has been connected to the driving mechanism, and the camera can then be opened and the exposed reel removed. The film holder F can then be placed on the live spindle 14 and have a reel placed within it, suitable for the attachment of the end of a new film, and another film holder such as F can then be placed on the stationary spindle 9.

As will readily be understood, the spindle 9 may carry the reel 7 in the film holder F, Fig. 8, and may be constructed so as to be free to revolve under the tension of the film, while the spindle 14 is mechanically revolved, as explained, and in such a case the reels may be made with a bore, polygonal in cross section, and be adapted to fit upon and engage the spindles 9 and 14, and the reels can in such case be made interchangeable and may have flanges, either detachable or permanent, on both ends of the reels.

The holders can be cheaply constructed, and need not necessarily be returnable, but where the film is developed by the film makers and not by the user, the holder must necessarily come back to the maker, and it can thus be used over and over again.

What I claim as my invention and desire to secure by Letters Patent is:—

1. A film holder for a strip of photographic film in roll form; comprising in combination a box, a removable cover to said box, an inwardly projecting sleeve passing through said cover, a similar sleeve passing through the bottom of said box and in axial alinement with said cover-sleeve through which sleeves passes a spindle by which the box is supported, a reel rotatably and removably mounted upon said sleeves within said box around which reel one end of the film passes, the other end of said film passing through a light-tight slot formed in the wall of said box and means to prevent the rotation of said box.

2. A film holder for a strip of photographic film in roll form; comprising in combination a stationary box, a removable cover to said box, means in said box to rotatably and removably support a reel around which latter one end of the film passes the other end of said film passing through a slot in the wall of the box and a velvet covered spring clip on opposite edges of said slot between which clips said film passes.

3. A holder for films in cinematographic apparatus; comprising in combination a box, a removable cover to said box, an inwardly projecting sleeve passing through said cover, a similar sleeve passing through the bottom of said box and in alinement with said cover-sleeve, a reel rotatably and removably carried by said sleeves within said box, means to removably and non-rotatably connect said reel to a spindle rotatably carried in the case of the apparatus, means to detachably connect one end of the film to said reel the other end of said film passing through a slot in the said box, a velvet covered spring clip on two opposite edges of said slot between which clips said film passes, and means to prevent the rotation of said box with said spindle.

4. A holder for films in cinematographic apparatus; comprising in combination a box, a removable cover to said box, an inwardly projecting sleeve passing through said cover, a similar sleeve passing through the bottom of said box and in alinement with said cover-sleeve, a reel rotatably and removably carried by said sleeves within said box, a pin extending through and at right angles to the axis of said reel adapted to engage the forked end of a spindle rotatably carried in the case of the apparatus to effect rotation of said reel with said spindle, means to detachably connect one end of the film to said reel the other end of said film passing through a slot in the said box, a velvet covered clip on two opposite edges of said slot between which clips said film passes, and means to prevent the rotation of said box with said spindle.

5. A holder for films in cinematographic apparatus; comprising in combination a box, a removable cover to said box, an inwardly projecting sleeve passing through said cover, a similar sleeve passing through the bottom of said box and in alinement with said cover-sleeve, a reel rotatably and removably carried by said sleeves within said box, a pin extending through and at right angles to the axis of said reel adapted to engage the forked end of a spindle rotatably carried in the case of the apparatus to effect rotation of said reel with said spindle, a spring plate removably carried by and partly surrounding said reel to engage one end of the film and clamp it to said reel the other end of said film passing through a slot in the said box, a velvet covered clip on two opposite edges of said slot between which clips said film passes, and means to prevent the rotation of said box with said spindle.

In witness whereof I have hereunto set my hand in the presence of two witnesses.

HORACE FISHER.

Witnesses:
GRIFFITH BREWER,
WILLIAM A. MARSHALL.